Sept. 13, 1927. H. O. McMILLAN Re. 16,736

CLAMP FOR CONCRETE COLUMN FORMS

Original Filed Sept. 22. 1924

INVENTOR
HOWARD O. McMILLAN
BY HIS ATTORNEY
James T. Williamson

Reissued Sept. 13, 1927. Re. 16,736

UNITED STATES PATENT OFFICE.

HOWARD O. McMILLAN, OF MINNEAPOLIS, MINNESOTA.

CLAMP FOR CONCRETE-COLUMN FORMS.

Original No. 1,539,053, dated May 26, 1925, Serial No. 739,067, filed September 22, 1924. Application for reissue filed November 6, 1926. Serial No. 146,832.

This invention relates to a clamp and particularly to a column clamp such as used in clamping forms for concrete columns. As is well known to those skilled in the art, in the formation of concrete columns the form is made, usually, of boards which are firmly held in position by a series of clamps so as to hold the concrete in proper position until it has set.

It is an object of this invention to provide a simple and efficient clamp for clamping a concrete column form and one which can be easily and quickly applied and operated to clamp the form.

It is also an object of this invention to provide such a clamp comprising pairs of bars adapted to extend around the corners of the form and overlap at the sides of the form, said overlapped bars having means for moving the same relatively longitudinally to tighten the clamp.

It is a further object of the invention to provide such a clamp comprising pairs of bars hinged or pivoted together and arranged to be folded into alined form when not in use, one of said bars preferably having a laterally disposed U-shaped portion arranged to embrace the other bar.

It is still further an object of the invention to provide such a clamp comprising pairs of bars, the bars of each pair extending at an angle to each other, said bars having longitudinally spaced slots extending transversely therethrough, the slots in one bar being spaced a greater distance than the slots in the other so that the same will be out of alinement in the respective bars together with a wedge member adapted to be disposed in said slots and relatively move said bars.

It is still another object of the invention to provide a clamp having pairs of bars, as above set forth, which bars are preferably flat and pivotally connected at one end with their flat sides in contact, said bars being offset out of the plane of said flat side adjacent said pivotal connection.

It is also an object of the present invention to provide a clamp, as set forth in the preceding paragraphs, comprising the pairs of bars, as stated, together with a wedge adapted to be driven through the slots in said bars to draw the same together.

These and other objects and advantages of the invention will be fully set forth in the following description made in connection with the accompanying drawings in which like reference characters refer to the same parts throughout the different views, and in which.

Figure 1:
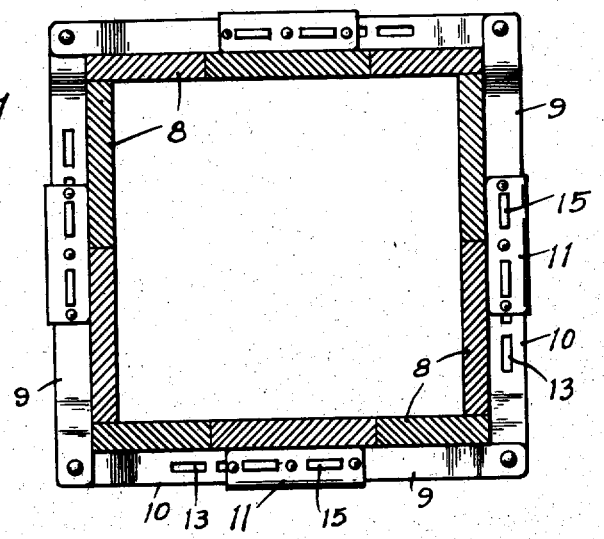
Fig. 1 is a view in horizontal section of the column form showing the clamp in plan.

Referring to the drawings, a form for a concrete column is shown as 8, said form being composed of vertically extending boards and the same being shown as rectangular or square. The clamp of the present invention comprises a plurality of pairs of bars adapted to embrace the column form. Each of said pairs comprises a bar 9 preferably of flat form which is pivotally connected at its ends to another bar 10. The bar 9 has secured at its free end a longitudinally extending yoke or U-shaped member 11. While this yoke may be secured to or formed on the bar in various ways, in the embodiment of the invention illustrated, it is shown as connected to the bar 9 by spaced rivets. The opening in the yoke 11 is directed laterally and is of such size as to freely receive the bar 10. The yoke 11 and bar 9 are provided with longitudinally extending slots 12 which extend transversely through said yoke and bar. While said slots may be spaced apart different distances, in the embodiment of the invention illustrated, they are shown as spaced substantially the distance of the length of one of the slots. The bar 10 is also provided with a series of longitudinally extending slots 13, said latter slots being spaced a smaller distance apart than the slots 12. While the slots 13 may also be spaced different distances, in the embodiment of the invention illustrated they are shown as spaced substantially one-third the length of one of the slots, the slots 12 and 13 being of substantially the same length. The bars 9 and 10 are offset laterally out of the plane of their flat sides adjacent the point of their pivotal connection as shown at 14 in Fig. 3. One or more wedge members 15 are provided for use in connection with the pairs of bars described, which wedges preferably are provided with a small hole 16 adjacent their wide ends.

Figure 2:
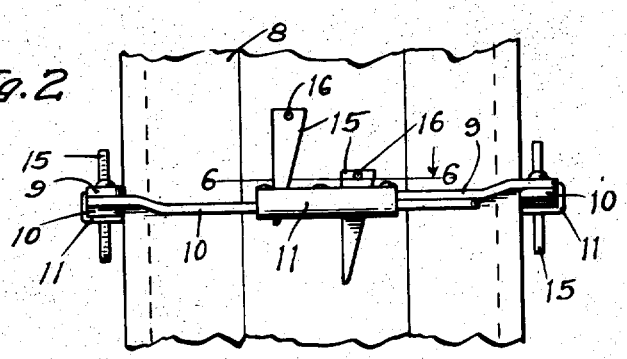
Fig. 2 is a view in front elevation of said column form and clamp.
Figure 4:
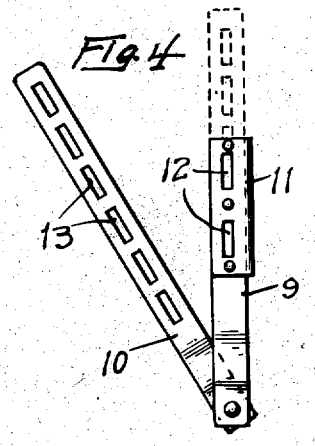
Fig. 4 is a view in side elevation of the clamp in partly open position.
Figure 6:
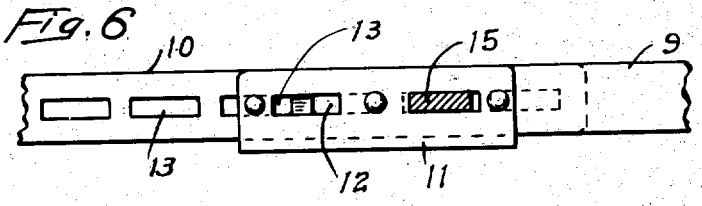
Fig. 6 is a horizontal section taken on the line 6—6 of Fig. 2, as indicated by the arrows.
Figure 5:
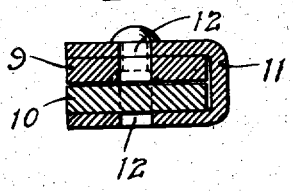
Fig. 5 is a horizontal section taken on the line 5—5 of Fig. 3, as indicated by the arrows.
Figure 7:
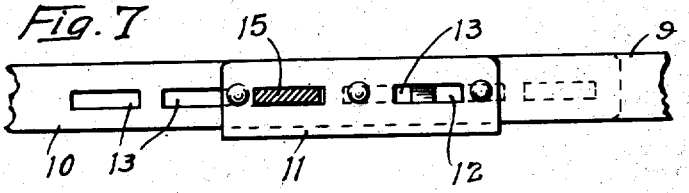
Fig. 7 is a view similar to Fig. 6 showing the parts in different position.

In operation, the pairs of bars will be placed about the column with the point of pivotal connection of the hinged pintle disposed at the corner of the form. The free ends of the bars thus project along the sides of the form and overlap at said sides. The end of one bar 10 overlaps the end of the adjacent bar 9 and passes through and is embraced by the yoke 11 on said bar 9. Owing to the fact that the slots in the bars are spaced differently, the slots will be out of alinement. The bars are initially disposed about the form so that the end of the bar 10 extends to or past the inner end of yoke 11. The slots in the bar 10 will then appear, for instance, as shown in Fig. 6, a portion of one of the slots 13 alining with the end portion of one of the slots 12. With the bars in this position about the form a wedge 15 is inserted downwardly through the slot 12 and its smaller end will engage in the exposed portion of slot 13. The wedge will now be driven downwardly and the bars 9 and 10 will be drawn together. This movement of the wedge can be continued until the slots 12 and 13 are substantially in alinement. When this occurs, as shown in Fig. 7, if it is desired to further tighten the form or clamp another wedge 15 will be inserted in the slot 11 at the right of Fig. 7 so that its small end will engage in the exposed portion of the adjacent slot 13. This wedge can now be driven downwardly, the wedge 15 pivotally driven being removed as soon as the second wedge tightly engages the bars. The bars can thus be drawn together so that the clamp will be tightened very securely about the form with practically any desired pressure. The last wedge driven, of course, will be left in the clamp to hold the same in position and will be held securely in the clamp by friction. Owing to the relative spacing of the slots in the two bars and the yoke 11, a continuous action by the wedges can be maintained and one of the slots 13 will always be in position to be engaged by the wedge driven in the yoke 11. A step by step or successive tightening action is thus obtained. Owing to the offset 14 in the bars it will be seen, by reference to Fig. 2, that the bar 10 is brought below the plane of the bar 9 which is at the adjacent sides of the column so that, if necessary, the bar 13 can project beyond the side of the column and will pass the bar 9 at the other side of the column.

Figure 3:
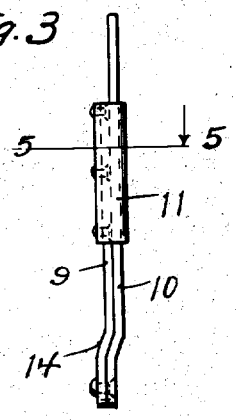
Fig. 3 is an edge view of the clamp in folded position.

When the clamp is not in use, the pairs of bars 9 and 10 can be folded or jack-knifed together, as shown in Fig. 3, the bar 10 swinging into the yoke 11 so that the pairs of bars are brought into very compact arrangement and will require little space in packing for transportation or storage. The wedges 15 are provided with the holes 16 so that they can be strung upon a wire or other flexible member and kept together during transportation or storage.

From the above description it is seen that applicant has provided a very simple and efficient column clamp and one that can be very quickly placed in position and operated. The clamp can be used with a triangular column or with any other polygonal column, such as hexagonal or octagonal columns, the pairs of bars embracing the columns, as shown in Fig. 1, the pivotally connected point being disposed at the corners and the ends of the bars overlapping at the sides. It will be noted that it is not necessary to have any bars projecting beyond the sides of the column so that the clamp may be used on a column which is very close to a wall or other object. The device is easily and inexpensively made and is of rugged character adapted to stand the usage for which it is designed. The device has been amply demonstrated in actual practice and found to be very successful and efficient.

It will, of course, be understood that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A column clamp comprising bars extending around the corners of a column form and overlapping at the sides of said column form, and means engaging said bars at their overlapped portions relatively to move said bars longitudinally and tighten said clamp.

2. A column clamp comprising pairs of hinged bars, each pair adapted to extend around a corner of the column and the ends of adjacent pairs adapted to overlap at the side of said column, said overlapped bars having means for successively moving the same in opposite directions longitudinally to tighten said clamp.

3. The structure set forth in claim 2, said bars being offset a distance greater than their thickness whereby the projecting ends will not be obstructed at the corners of the form.

4. A column clamp comprising bars extending around the corners of a column form and overlapping at the sides of said column form, means for moving said bars relatively longitudinally, one of said bars having a laterally disposed U-shaped portion adapted to receive and embrace the other bar whereby the bars can be folded in alined relation.

5. A column clamp comprising bars extending around the corners of a column form and overlapping at the sides of said column form, one of said bars having a pair of spaced longitudinal slots extending transversely therethrough, the other bar having a plurality of similar longitudinal slots extending transversely therethrough of different spacing whereby the slots in the respective bars are out of alinement, and means adapted to be inserted through the slots of adjacent bars when the clamp is applied to the column to move said bars longitudinally and tighten said clamp.

6. The structure set forth in claim 5, the slots in the first mentoned bar being spaced a distance substantially the length of one of said slots and the slots in the second mentioned bar being spaced a distance substantially one-third of the length of said slots.

7. A clamp for a concrete column form comprising a plurality of pairs of bars, the bars of each pair being angularly disposed and adapted to extend around one corner of a column form and overlap the bars extending around an adjacent corner at the sides of said form, one of the bars of each pair having a laterally disposed U-shaped portion adjacent its free end adapted to embrace the other bar, said U-shaped portion having spaced slots extending transversely through both sides thereof, the other bar having a series of slots extending transversely therethrough, said latter slots being spaced closer together than said first mentioned slots whereby the slots in said bar and U-shaped portion, respectively, are out of alinement, and a wedge adapted to extend through slots in adjacent bars when the bars are applied to the form to move said bars longitudinally and tighten said clamp.

8. A column clamp comprising pairs of hinged bars, each pair adapted to extend around a corner of the column and the ends of adjacent pairs adapted to overlap at the side of said column, said ends each being provided with a plurality of longitudinally disposed slots extending transversely through said bairs, the slots in the respective bars being spaced different distances apart whereby they are out of alinement, and a wedge adapted to be driven into the slots in adjacent bars when the bars are applied to the column to move said bars and tighten said clamp.

9. The structure set forth in claim 8, said bars being offset transversely adjacent their hinged points.

10. A clamp for a concrete column form comprising a plurality of pairs of bars, the bars of each pair being pivotally connected together at one of their ends and one being formed at its other end with a laterally disposed yoke adapted to receive and embrace the other bar, said yoke having spaced longitudinally disposed slots extending transversely therethrough and the other bar having a plurality of longitudinally disposed slots extending transversely therethrough spaced closer together than the slots in said yoke, said slots being of substantially the same length in said yoke and bar, and a wedge adapted to be inserted in the slots in said yoke and bar whereby said bars may be drawn together longitudinally.

11. A column clamp comprising a plurality of pairs of flat bars, the bars of each pair being pivotally connected at one end, a yoke secured adjacent the end of one of said bars of each pair, said yoke opening laterally and adapted to receive and embrace the other bar, said yoke having longitudinally spaced slots extending transversely therethrough, the other bar having a series of longitudinally disposed similar slots spaced a smaller distance apart, and a wedge adapted to be inserted through the slots in said yoke and a slot in the other bar of the adjacent pair of bars when the clamp is applied to the column whereby a successive tightening may be effected.

12. The structure set forth in claim 11, said bars being offset in a direction normal to their flat sides out of the plane of the main portions thereof adjacent their points of pivotal connection.

13. A column clamp comprising bars arranged to extend about the sides of the column form and overlap, means for tightening said bars on said form comprising a member embracing one of said bars and having a series of spaced slots extending therethrough, said bar also having a series of slots extending therethrough adapted to aline with said slots in said member, but spaced a much smaller distance apart than the slots in said member, and wedges adapted to pass through said slots in said member and bar and relatively move the same so that a continuous take-up on said bar may be had by inserting said wedges through the slots in said member and bar.

14. A clamp for a concrete column form comprising a plurality of pairs of bars, the bars of each pair being pivotally connected together at one of their ends and extending respectively about the sides of said form, a member adapted to embrace one of said bars, and having spaced longitudinally disposed slots extending transversely therethrough and said bar having a plurality of longitudinally disposed slots extending transversely therethrough, spaced apart less than half the distance said slots in said member are spaced, said slots in said member and bar being adapted to be brought into alinement and a wedge adapted to be inserted through the slots in said member and bar for longitudinally moving the same so that the slot in said bar is always in position to receive a wedge passed through the slots in said member and a continuous take-up on said bar may thus be had.

15. A clamp comprising two members adapted to be relatively moved to tighten said clamp, one of said members embracing the other and having a plurality of spaced slots extending therethrough, said other member also having a plurality of spaced slots extending therethrough adapted to aline with the slots in said first mentioned member, the slots in one of said members being spaced less than half the distance that the slots in the other member are spaced, and wedge means adapted to pass through said slots in said members and relatively move the same so that a continuous take-up may be had between said members.

16. The structure set forth in claim 15, the slots in one of said members being spaced substantially the distance of the length of said slots, and the slots in the other member being spaced substantially one-third of said distance.

17. A clamp for a concrete column form comprising a plurality of pairs of bars, the bars of each pair being pivotally connected together at one end and extending respectively about the sides of said form, a member receiving the overlapped ends of said bars, said member and said bars having longitudinally alined spaced slots extending respectively therethrough, one of said sets of slots being spaced less than half the distance of said other set, and wedges adapted to extend through the slots in said member and said bars so that a continuous take-up may be had between said member and bars.

18. A clamp for a concrete form comprising a plurality of pairs of bars, the bars of each pair being pivotally connected together at one end and extending respectively about the sides overlapping at their free ends, a member receiving the overlapped ends of said bars having slots extending therethrough, wedges adapted to be driven in said slots and engage said bars relatively to move said member and bars, said slots being so arranged that a continuous take-up may be had between said bars and member by using first one wedge and then another.

In testimony whereof I affix my signature.

HOWARD O. McMILLAN.